United States Patent [19]
Watanabe et al.

[11] Patent Number: 4,783,723
[45] Date of Patent: Nov. 8, 1988

[54] ELECTRIC DOUBLE-LAYER CAPACITOR

[75] Inventors: Koichi Watanabe; Michinobu Maesaka; Michihiro Murata; Yoshio Arakawa, all of Nagaokakyo, Japan

[73] Assignee: Murata Manufacturing Co., Ltd., Japan

[21] Appl. No.: 18,603

[22] Filed: Feb. 25, 1987

[30] Foreign Application Priority Data

Mar. 31, 1986 [JP] Japan ................................. 61-75338

[51] Int. Cl.4 ................................................. H01G 9/02
[52] U.S. Cl. .................................................. 361/433
[58] Field of Search ..................... 361/433; 24/90 HA

[56] References Cited

U.S. PATENT DOCUMENTS

| | | | |
|---|---|---|---|
| 3,206,818 | 9/1965 | Knowlton | 24/90 HA X |
| 4,023,079 | 5/1977 | Selover et al. | 361/433 |
| 4,594,758 | 6/1986 | Watanabe et al. | 361/433 |
| 4,626,964 | 12/1986 | Azuma et al. | 361/433 |
| 4,642,876 | 2/1987 | Murray et al. | 361/433 X |

Primary Examiner—Donald A. Griffin
Attorney, Agent, or Firm—Ostrolenk, Faber, Gerb & Soffen

[57] ABSTRACT

An electric double-layer capacitor comprises a gasket encircling a pair of polarizable electrodes provided on opposite sides of a separator, and a pair of collectors provided on outer sides of the polarizable electrodes and sealed to the gasket. The gasket is formed of a base of vulcanized rubber and resin layers obtained by fusion-welding polyolefin resin on both surfaces of the base, and the collectors are heat-sealed to the gasket.

6 Claims, 2 Drawing Sheets

ELECTRIC DOUBLE-LAYER CAPACITOR

BACKGROUND OF THE INVENTION

1. Field of the Invention

The present invention relates to an electric double-layer capacitor with improved structure for receiving polarizable electrodes.

2. Description of the Prior Art

An electric double-layer capacitor is desired to be reduced in size and thickness, similarly to other electronic components. Wound type and plate type electric capacitors are known general types of electric double-layer capacitors, and such a plate type capacitor can be suitably reduced in thickness.

FIG. 2 shows an example of a conventional plate type electric double-layer capacitor. This electric double-layer capacitor 1 comprises a gasket 2 of butyl rubber or ethylene propylene rubber and a pair of polarizable electrodes 4 and 5 provided therein and separated by a separator 3. The separator 3 is adapted to prevent electronic conduction between the upper and lower polarizable electrodes 4 and 5 while allowing permeation of ions, and is generally formed by a microporous film of polypropylene or nonwoven fabric impregnated with 50% sulfuric acid. The polarizable electrodes 4 and 5 are made of solid carbonaceous compacts obtained by adding dispersion of chlorosulfonated polyethylene as a binder to activated carbon powder and pressure-forming the same, or by punching them from cloth of activated carbon fiber.

Collectors 6 and 7 for airtightly sealing the polarizable electrodes 4 and 5 are formed by plastic sheets of butyl rubber, ethylene propylene rubber or polyisobutylene supplied with conductivity by including conductive carbon. The collectors 6 and 7 are adhered and fixed to the gasket 2 by coating, e.g., a rubber adhesive agent on both surfaces of the gasket 2 by printing or the like. Since the interior of this element is preferably evacuated and airtightly sealed, the adhesion is generally performed under vacuum conditions.

However, since the aforementioned electric double-layer capacitor 1 employs adhesive agents 8 and 9, a long time is required for complicated operations such as coating and hardening of the adhesive agents.

Further, upon application of the adhesive agents 8 and 9, the collectors 6 and 7 and the gasket 2 are changed in size by swelling of the rubber material, leading to inferiority in workability. Further, the adhered portions are not sufficient in airtightness, whereby an electrolyte is liable to leak or evaporate.

SUMMARY OF THE INVENTION

Accordingly, an object of the present invention is to provide a highly reliable electric double-layer capacitor having excellent airtightness, which can solve the aforementioned problems caused by employment of the adhesive agent and which can be efficiently manufactured through simple steps.

The electric double-layer capacitor according to the present invention comprises an electrically insulated ion-permeable separator, a pair of polarizable electrodes oppositely provided and separated by the separator, a pair of collectors provided on the outer sides of the polarizable electrodes and a gasket for holding the polarizable electrodes between the pair of collectors. The gasket comprises a base of vulcanized rubber and resin layers formed by fusion-welding polyolefin resin on both surfaces of the base. The collectors are fixed to the gasket by a heat sealing process.

The present invention employs a gasket having a base of vulcanized rubber, and polyolefin resin is fusion-welded to both surfaces of the base as hereinabove described. Thus, characteristics of the electric double-layer capacitor of the present invention are (a) the same has rubber elasticity as a whole, (b) the same is provided with surfaces to which collectors can be adhered by heat sealing and (c) substantially deformation is not caused by melting and softening in the heat seal process.

In a general electric double-layer capacitor as shown in FIG. 3, a plurality of elements 11 are series-connected and contained in a case 12, thereby to obtain a single component. The respective elements 11 are not only laminated but integrated with each other under pressure, to be contained in the case 12. Therefore, the gasket of the electric double-layer capacitor is made to be slightly larger in thickness than the stacked polarizable electrodes received therein, and is then deformed to have the same thickness as the polarizable electrodes by said pressing force for lamination and integration, in order to simplify the manufacturing steps. Thus, it is understood that the gasket of the electric double-layer capacitor element preferably has the aforementioned characteristic (a), i.e., rubber elasticity. Further, the gasket preferably has rubber elasticity as a whole in order to stabilize the equivalent series resistance and improve airtightness.

According to the present invention, further, the gasket has surfaces to which collectors can be adhered by heat sealing as hereinabove described as item (b), whereby the collectors can be heat-sealed without employing any adhesive agent.

If the electric double-layer capacitor is only required to satisfy the conditions (a) and (b), it is possible to form the gasket by a certain type of hot melting material or elastomer. With such material, however, a gasket 13 is entirely melted and softened in heat seal process, and thereby deformed as shown in FIG. 4, which interferes with the manufacturing of the element. Even if the element could be manufactured, it could not be obtained in a designed size. Thus, the gasket must also have the aforementioned characteristic (c). Thus, according to the present invention, the gasket is formed having a base of vulcanized rubber in order to satisfy the aforementioned conditions (a) to (c).

Thus, according to the present invention, the gasket is formed with the base of vulcanized rubber and the resin layers obtained by fusion-welding polyolefin resin on both surfaces of the base, whereby the electric double-layer capacitor can be readily manufactured without employing an adhesive agent, while workability is greatly improved since no size change is caused by swelling following the adhering operation. Further, the gasket is not deformed in the heat seal process, whereby a product superior in size stability and appearance can be obtained. In addition, the polarizable electrodes are sealed in the gasket through a heat seal method without employing any adhesive agent, whereby airtightness is also greatly improved. Thus, even if the electric double-layer capacitor is employed under severe conditions such as a high-temperature environment, the electrolyte does not substantially leak or evaporate, so the electric double-layer capacitor is superior in reliability.

These and other objects, features, aspects and advantages of the present invention will become more appar-

DESCRIPTION OF THE PREFERRED EMBODIMENTS

Figure 1:
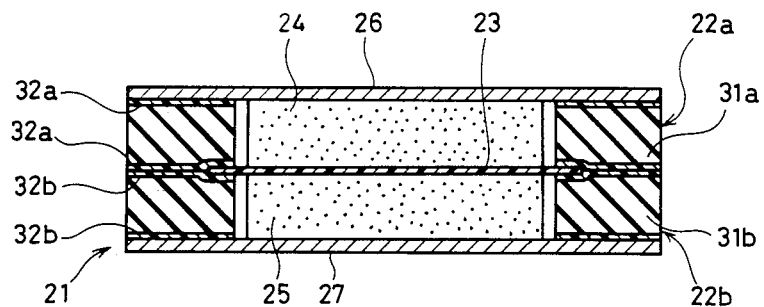
FIG. 1 is a sectional view showing an embodiment of the present invention.

FIG. 1 is a sectional view showing an embodiment of the present invention.

Figure 2:
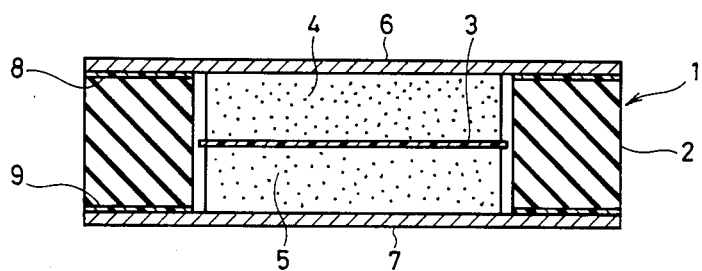
FIG. 2 is a sectional view showing a conventional electric double-layer capacitor.

An electric double-layer capacitor 21 of this embodiment comprises an electrically insulated ion-permeable separator 23 and a pair of polarizable electrodes 24 and 25 oppositely provided on both sides thereof. The separator 23 and the polarizable electrodes 24 and 25 can be formed of the same materials as in the conventional electric double-layer capacitor as shown in FIG. 2.

According to this embodiment, a gasket is formed by fusion-welding gasket half bodies 22a and 22b integrally with each other. The gasket half bodies 22a and 22b have respective bases 31a and 31b of vulcanized rubber, and resin layers 32a and 32b provided on both surfaces of the bases 31a and 31b. The separator 23 is held and sealed between the gasket half bodies 22a and 22b by a heat seal process, and thereby integrated with the gasket half bodies 22a and 22b. Collectors 26 and 27 are heat-sealed to outer surfaces of the gasket half bodies 22a and 22b.

Figure 5:
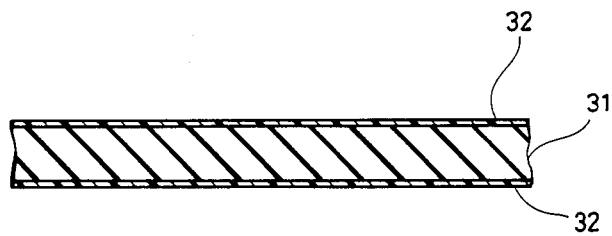
FIG. 5 is a sectional view showing a rubber sheet and resin layers employed for forming a gasket in the embodiment as shown in FIG. 1.

An electric double-layer capacitor as shown in FIG. 1 may be manufactured as follows: As shown in FIG. 5, low-density polyethylene films 32 of 50 μm in thickness are adhered to both surfaces of an unvulcanized ethylene propylene rubber sheet 31 of 0.5 mm in thickness to be heated and vulcanized while under a pressure of about 1 to 5 kg/cm². The respective gasket half bodies 22a and 22b are obtained from the laminated sheet thus obtained, through punching means or the like. The polyethylene and the unvulcanized rubber are fusion-welded to each other at the surfaces of the rubber sheet in an initial stage of heating and vulcanization, followed by continuation of vulcanization into the interior of the rubber sheet, whereby the polyethylene films are strictly adhered to the surfaces of the vulcanized rubber sheet and integrated therewith.

The separator 23 is held between the gasket half bodies 22a and 22b prepared in the aforementioned manner and then heat-sealed, and then the polarizable electrodes 24 and 25 are provided on both surfaces of the separator 23 and enclosed by the collectors 26 and 27. Then the collectors 26 and 27 are heated to heat seal them to the both surfaces of the gasket.

While the resin layers of polyethylene are formed on the surfaces of the bases in the aforementioned embodiment, heat sealing cannot be performed between different types of materials in the case of polyethylene. Particularly when the electric double-layer capacitor employs a nonaqueous electrolyte, it is desirable for the collectors to be prepared from a metal such as stainless steel or aluminum and for the gasket surfaces to be heat-sealed to such metal. In order to satisfy such requirement through absolutely similar processing, the aforementioned low density polyethylene can be replaced by, e.g., ionomer, ethylene-acrylic acid copolymer or denaturated polyethylene or denaturated polypropylene containing carboxyl group.

The aforementioned polyolefin resin is heat-sealed at a temperature of about 100° to 200° C. This is because sufficient adhesion cannot be obtained if the temperature is lower than 100° C., while the polyolefin resin is molten when the temperature exceeds 200° C. Preferable temperature ranges for heat sealing are about 100° to 130° C. for low-density polyethylene, about 100° to 140° C. for ionomer, about 100° to 140° C. for denaturated polyethylene and about 160° to 200° C. for denaturated polypropylene.

Thus, examples of polyolefin for forming the resin layers on the bases are low-density polyethylene, ionomer, ethylene-acrylic acid copolymer and denaturated polyethylene or denaturated polypropylene containing carboxyl group.

The gasket bases can be prepared from various rubber materials such as ethylene propylene rubber such as ethylene propylene copolymer rubber or ethylene propylene terpolymer and butyl rubber, to be similarly fusion-welded with the polyolefin films. Primer layers may be preferably interposed between the rubber bases and the polyolefin films to improve the fusion welding strength.

The type and composition of the rubber material for forming the bases, the type and grade of polyolefin resin and employment/unemployment of the primer layers may be arbitrarily selected in consideration of adhesive strength and the like.

Figure 6:
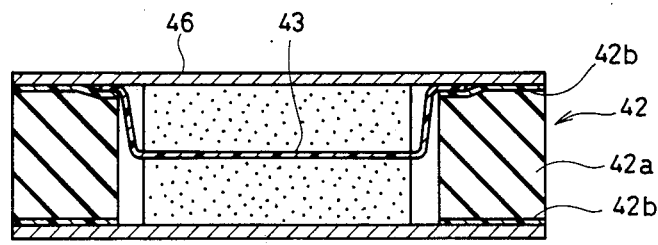
FIG. 6 is a sectional view showing a second embodiment of the present invention.

Although the gasket is formed from the gasket half bodies 22a and 22b in the embodiment of FIG. 1, an electric double-layer capacitor may be formed from a gasket 42 comprising a single member as shown in FIG. 6. In the embodiment as shown in FIG. 6, the gasket 42 is formed from a base 42a and resin layers 42b provided on both surfaces of the base 42a. The peripheral edge of a separator 43 is held between one surface of the gasket 42 and one collector 46 and integrally heat-sealed with the same. Other structure of this embodiment is similar to that of the embodiment as shown in FIG. 1.

Figure 7:
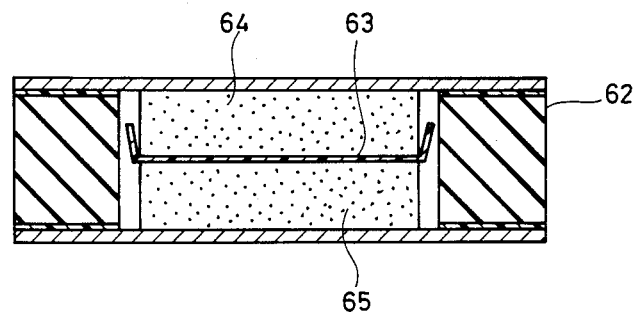
FIG. 7 is a sectional view showing a third embodiment of the present invention.

As shown in FIG. 7, a separator 63 may not be integrated with a gasket 62. In the embodiment of FIG. 7, the peripheral edge of the separator 63 is bent to encircle one polarizable electrode 64. Thus, even if polarizable electrodes 64 and 65 are moved to some extent, they will not come into contact with each other and hence a short circuit will be prevented.

EXAMPLE

Low density polyethylene films of 0.05 mm in thickness were laminated on both surfaces of a sheet of unvulcanized ethylene propylene terpolymer rubber (EPDM) of 0.5 mm in thickness and pressed under a pressure of about 3 Kg/cm² at a temperature of about 160° C., to be subjected to vulcanization. The laminated sheet thus obtained was punched in an annular configuration of 7.0 mm in inner diameter and 10.5 mm in outer diameter, to form a gasket. Then, a polyethylene film of 0.1 mm in thickness supplied with conductivity by including carbon was punched in a circular configuration of 10.5 mm in diameter to form a collector, which was sealed on one surface of the gasket through a heat seal method.

Figure 3:
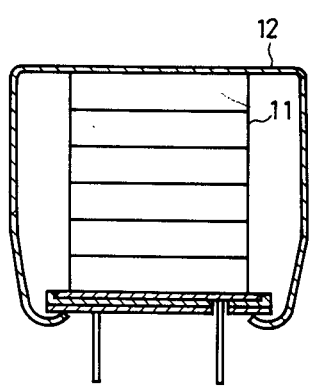
FIG. 3 is a schematic sectional view showing an electric double-layer capacitor obtained by stacking electric double-layer capacitor elements.
Figure 4:
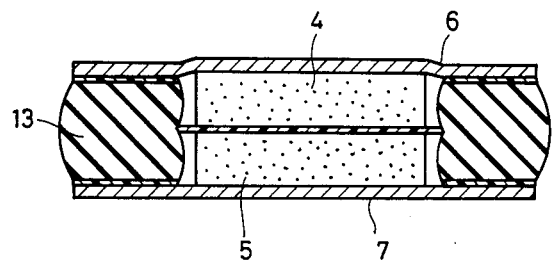
FIG. 4 is a sectional view illustrating problems in forming a gasket with elastomer.

A pair of polarizable electrodes of 6.0 mm in diameter and 0.3 mm in thickness were prepared from solid carbonaceous compacts obtained by adding chlorosulfonated polyethylene dispersion as binder to activated carbon powder and pressure-forming the same. A microporous polypropylene film of 25 $\mu$m in thickness and 7.0 mm in diameter was held between the polarizable electrodes and impregnated with 30% sulfuric acid, to be contained in a cavity defined by the aforementioned gasket and the collector. Another collector was placed on the same and heat-sealed to the gasket in a depressurized atmosphere, and the element was airtightly sealed. Six such electric double-layer capacitor elements were laminated and integrated in case under a pressure as shown in FIG. 3, to manufacture a 5.5 V rated electric double-layer capacitor.

As a Reference Example for purposes of comparison, a vulcanized ethylene propylene terpolymer rubber sheet of 0.65 mm in thickness was punched to manufacture an electric double-layer capacitor element through a gasket similar in configuration to that in the Example. A collector was prepared by punching a polyisobutylene film of 0.2 mm in thickness supplied with conductivity by including carbon in the same configuration as the Example. Adhesion of the gasket and the collector was performed by coating a cross-linking type rubber adhesive agent on each surface of the gasket and the collector through a printing process to be adhered thereto after evaporating an organic solvent by heating and pressurizing the same. After the adhesion, hardening was performed at a temperature of 85° C. Other structure was identical to that of the Example. Six such electric double-layer capacitor elements were laminated to obtain a reference electric double-layer capacitor.

The electric double-layer capacitors of the Example and the reference example were left in a high temperature of 85° C. for 1000 hours. The following Table shows characteristic and weight changes before and after the high-temperature standing test.

TABLE

| | Before High-Temperature Standing | | After High-Temperature Standing | | |
|---|---|---|---|---|---|
| | Electrostatic Capacitance (F) | ESR ($\Omega$) | Electrostatic Capacitance (F) | ESR ($\Omega$) | Weight Decrease Rate |
| Example | 0.077 | 12.0 | 0.073 | 11.4 | 0.16% |
| Reference Example | 0.078 | 10.5 | 0.064 | 12.8 | 0.54% |

It is understood from the above Table that the electrostatic capacitance of the inventive electric double-layer capacitor is not substantially lowered after the high-temperature standing test. Further, equivalent series resistance is not increased and the weight decrease rate is extremely small. In the reference example, on the other hand, the electrostatic capacitance is considerably lowered and the equivalent series resistance is increased while the weight is considerably decreased after the high-temperature standing test.

Although embodiments of the present invention have been described and illustrated in detail, it is clearly understood that the same is by way of illustration and example only and is not to be taken by way of limitation, the scope of the present invention being limited only by the terms of the appended claims.

What is claimed is:

1. An electric double-layer capacitor comprising:
an electrically insulating ion-permeable separator;
a pair of polarizable electrodes oppositely provided on upper and lower sides of said separator;
a pair of collectors provided on the outer sides of respective said polarizable electrodes away from said separator; and
a gasket enclosing said polarizable electrodes for holding said polarizable electrodes between said pair of collectors,
said gasket comprising at least one base of vulcanized rubber and a pair of resin layers formed of polyolefin resin fusion-welded on top and bottom surfaces of said gasket, said collectors being heat-sealed to said resin layers on said top and bottom surfaces of said gasket.

2. An electric double-layer capacitor in accordance with claim 1, wherein said polyolefin resin is selected from the group consisting of low-density polyethylene, ionomer, ethylene-acrylic acid copolymer and denaturated polyethylene or denaturated polypropylene containing carboxyl group.

3. An electric double-layer capacitor in accordance with claim 1, wherein said vulcanized rubber is ethylene propylene rubber, said polyolefin resin is low-density polyethylene and said collectors are prepared from polyethylene or ethylene-propylene copolymer supplied with conductivity by including carbon.

4. An electric double-layer capacitor in accordance with claim 1, wherein said gasket comprises first and second half bodies, each having a base of vulcanized rubber and a pair of layers of polyolefin resin formed on inner and outer surfaces of said base,
said inner resin layers of said first and second gasket half bodies being heat-sealed to each other with a peripheral edge portion of said separator held between them.

5. An electric double-layer capacitor in accordance with claim 1, wherein a peripheral edge portion of said separator is held and fixed between one surface of said gasket and one of said collectors,
one of said polarizable electrodes being arranged in a space defined by said separator and said one collector.

6. An electric double-layer capacitor in accordance with claim 1, wherein a peripheral edge portion of said separator is bent toward one of said polarizable electrodes to at least partially encircle said one polarizable electrode.

* * * * *